(12) United States Patent
Kondameedi

(10) Patent No.: US 10,730,146 B2
(45) Date of Patent: Aug. 4, 2020

(54) METHOD AND APPARATUS FOR REMOVING MATERIAL FROM A CUTTING INSERT USING ELECTROMAGNETIC RADIATION

(71) Applicant: Kennametal Inc., Latrobe, PA (US)

(72) Inventor: Naveen Kondameedi, Sylvania, OH (US)

(73) Assignee: KENNAMETAL INDIA LIMITED, Bangalore (IN)

( * ) Notice: Subject to any disclaimer, the term of this patent is extended or adjusted under 35 U.S.C. 154(b) by 1208 days.

(21) Appl. No.: 14/605,548

(22) Filed: Jan. 26, 2015

(65) Prior Publication Data
US 2015/0231736 A1 Aug. 20, 2015

(30) Foreign Application Priority Data
Feb. 19, 2014 (IN) .............................. 782/CHE/2014

(51) Int. Cl.
*B23K 26/36* (2014.01)
*B23K 26/362* (2014.01)
*B23K 101/20* (2006.01)

(52) U.S. Cl.
CPC ............ *B23K 26/362* (2013.01); *B23K 26/36* (2013.01); *B23K 2101/20* (2018.08)

(58) Field of Classification Search
CPC .. B23K 26/362; B23K 26/36; B23K 2201/20; B23K 26/0078; B23K 26/00; B23K 26/0087; B23B 35/00; B23B 27/143; B23B 2260/092
See application file for complete search history.

(56) References Cited

U.S. PATENT DOCUMENTS 6,190,096 B1 2/2001 Arthur
7,158,280 B2 1/2007 Sandstrom
(Continued)

FOREIGN PATENT DOCUMENTS

CN 102126082 A 7/2011
CN 103521925 A 1/2014
(Continued)

OTHER PUBLICATIONS

DE 102015102359, Nov. 2, 2015 First office action DE 102015102359.
Jul. 27, 2017 First office action K-04377-CN-NP.

*Primary Examiner* — Brian W Jennison
(74) *Attorney, Agent, or Firm* — Larry R. Meenan

(57) ABSTRACT

A method and apparatus for removing material from a cutting insert is disclosed. A source of electromagnetic radiation produces a laser beam that passes through a aperture for truncating a dimension of the laser beam and a homogenizer for providing a cross section of the laser beam with a uniform energy density. A mask having a predetermined shape reduces the dimension of the laser beam, and an imaging lens projects the laser beam onto a surface of the cutting insert. The predetermined shape of the mask provides for selective adjustment of an amount of material removed from the surface of the cutting insert. In one embodiment, the mask has a shape of an isosceles trapezoid for producing a T-land surface at the intersection between a top rake face and the flank face of the cutting insert.

20 Claims, 3 Drawing Sheets

(56) References Cited

U.S. PATENT DOCUMENTS

| | | | |
|---|---|---|---|
| 7,847,213 B1* | 12/2010 | Anikitchev | B23K 26/06 219/121.61 |
| 2007/0000884 A1* | 1/2007 | Salama | B23K 26/0622 219/121.68 |
| 2012/0021540 A1 | 1/2012 | Takahashi et al. | |
| 2012/0212716 A1 | 8/2012 | Shirai et al. | |
| 2012/0230785 A1* | 9/2012 | Chen | B23B 27/141 407/114 |
| 2013/0126573 A1 | 5/2013 | Hosseini et al. | |
| 2013/0183623 A1 | 7/2013 | Shibazaki | |
| 2013/0238022 A1* | 9/2013 | Gross | A61B 17/06166 606/228 |

FOREIGN PATENT DOCUMENTS

| | | |
|---|---|---|
| CN | 104294213 A | 1/2015 |
| DE | 19724319 C1 | 10/1991 |
| DE | 10 2006 007 356 A1 | 2/2006 |
| DE | 102009034576 A1 | 2/2011 |
| JP | 3193289 A2 | 8/1991 |

\* cited by examiner

METHOD AND APPARATUS FOR REMOVING MATERIAL FROM A CUTTING INSERT USING ELECTROMAGNETIC RADIATION

CLAIM TO PRIORITY

This application is a National entry application of Indian Application No. 782/CHE/2014, filed on Feb. 19, 2014, the entire contents of which is incorporated herein by reference.

BACKGROUND OF THE INVENTION

Field of the Invention

The invention pertains to the field of cutting inserts. More particularly, the invention pertains to a method of removing material from the cutting insert using electromagnetic energy.

Description of Related Art

Typically, a cutting insert is made up of a substrate that may include any one of a number of hard materials, or a combination thereof. For example, the cutting insert may be composed of cubic boron nitride (CBN), ceramic, carbide, polycrystalline diamond (PCD), mono crystalline diamond, polycrystalline cubic boron (PCBN) with layers of nitride, doped nitride layer, diamond layer, diamond like carbon layer, titanium aluminum nitride, titanium carbide, titanium carbonitride, titanium nitride, and/or alumina. The cutting edges are formed by force grinding, Electro-discharge grinding, edge-prep (honing), electrical discharge machining (EDM) or similar operations.

Typically, material is removed from a substrate of the cutting insert using a grinding wheel. Unfortunately, material removal rates are meager with conventional grinding techniques because the grinding wheel, which is made of a composite material, such as a metal and/or a ceramic binder with cubic boron nitride (CBN) or diamond particles embedded in a matrix, is incapable of removing material at a sufficiently large rate.

Not only is the material removal rate insufficient using a grinding wheel, the quality of material removed is inadequate using a grinding wheel. For example, when grinding with a wheel having a mesh size of 400-1800 grit, more often, the PCD or CBN particulates are removed from the matrix in the workpiece, thereby creating a void. As a result, surface integrity and tool performance is compromised. Thus, there is a need to improve material removal rates and the quality of material removed from cutting inserts, particularly cutting inserts coated with hard materials.

SUMMARY OF THE INVENTION

The problem of removing material from a cutting insert is solved by focusing a source of electromagnetic radiation onto a surface of the cutting insert.

In one aspect of the invention, a method of removing material from a cutting insert comprising focusing a laser beam onto a surface of the cutting insert, thereby creating a surface feature on the surface of the cutting insert.

In another aspect of the invention, a method of removing material from a cutting insert, comprising:
producing a laser beam using a source of electromagnetic radiation;
passing the laser beam through a homogenizer such that a cross section of the laser beam has a uniform energy density;
passing the laser beam through a mask having a predetermined shape, wherein the mask reduces a dimension of the laser beam; and
focusing the laser beam onto a surface of the cutting insert, whereby an amount of material removed from the cutting insert can be selectively adjusted by changing the predetermined shape of the mask.

In another aspect of the invention, an apparatus for removing material from a cutting insert comprises a source of electromagnetic radiation for producing a laser beam; a homogenizer for providing a cross section of the laser beam with a uniform energy density; a mask having a predetermined shape for reducing the dimension of the laser beam; and an imaging lens for projecting the laser beam onto a surface of the cutting insert, wherein the predetermined shape of the mask provides for selective adjustment of an amount of material removed from the surface of the cutting insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
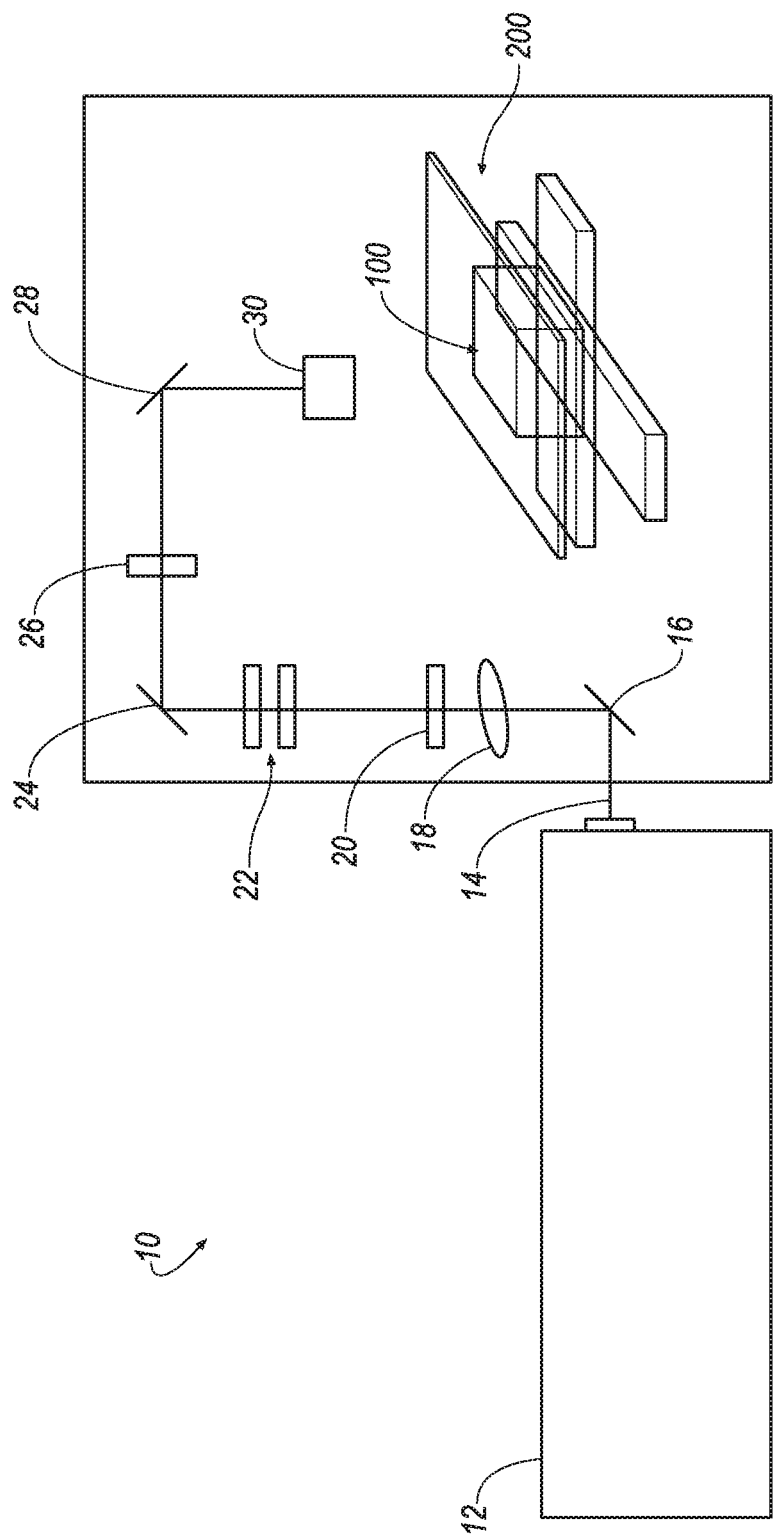
FIG. 1 is a schematic diagram of an apparatus for removing material from a cutting insert according to an embodiment of the invention.

Referring now to FIG. 1, an apparatus 10 for removing material from a cutting insert 100 is shown according to an embodiment of the invention. The apparatus 10 includes a source 12 of electromagnetic radiation, such as an ultraviolet (UV) excimer laser, that emits a laser beam 14 having a predetermined frequency and dimension. For example, the laser beam 14 can have a frequency of about 248 nm and a dimension of about 10×24 mm. It will be appreciated that the invention is not limited by the frequency and dimension of the laser beam 14, and that the invention can be practiced with any desirable frequency and dimension that is suitable to remove material from the cutting insert 100. For example, the laser beam 14 can be produced by a diode-pumped solid-state (DPSS) laser, and the like.

In addition, the apparatus further includes a turning mirror 16 that directs the laser beam 14 through a field lens 18. The laser beam 14 then passes through an aperture 20 and a homogenizer, shown generally at 22. The aperture 20 truncates the dimension of the laser beam 14. For example, the laser beam 14 may have a dimension of about 7×10 mm when the laser beam 14 exits the homogenizer 22. The homogenizer 22 provides a uniform energy density in the cross section of the laser beam 14. Then, the laser beam 14 is directed by a turning mirror 24 though a mask 26, which is then directed by a turning mirror 28 to a projection or imaging lens 30 that projects the laser beam 14 onto the surface of the cutting insert 100. The cutting insert 100 can be mounted on an X-Y table 200 of a type well-known in the art for pre-programmed movement of the cutting insert 100 relative to the laser beam 14.

It will be appreciated that the apparatus 10 of the invention described above is for illustrative purposes only, and that the principles of the invention can be practiced with other apparatuses that produce a laser beam with the desired characteristics for removing material from the cutting insert 100.

Figure 2A:
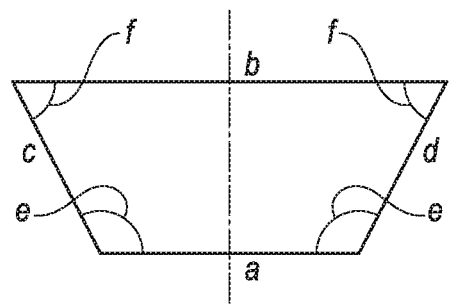
FIGS. 2A-2C are diagram representations of various shapes of the mask for reducing the dimension of the laser beam projected onto the surface of the cutting insert.
Figure 2B:
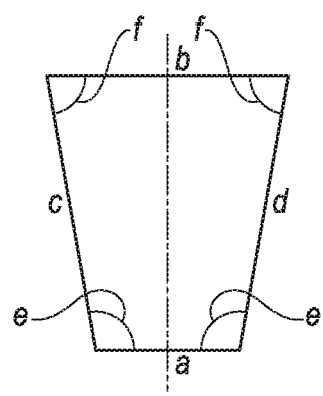
Figure 2C:
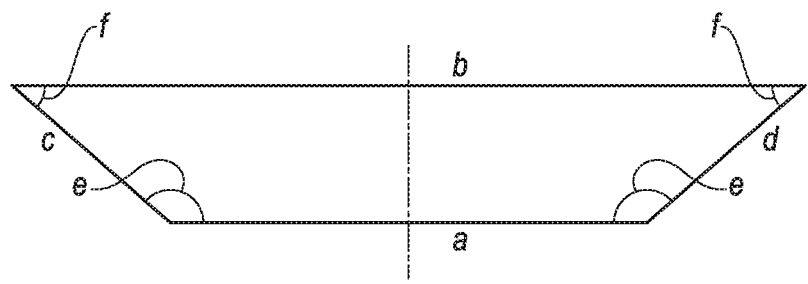

One aspect of the invention is that the mask 26 has a predetermined shape such that the dimension of the laser beam 14 is reduced and concentrated to selectively adjust an amount of material removed from the surface of the cutting insert 100. In one embodiment, the mask 26 has a shape of an isosceles trapezoid to reduce and concentrate the laser beam 14, as shown in FIGS. 2(a)-(c). In this embodiment, the mask 26 can be used to produce a T-land surface on the cutting insert 100, as described below. However, it will be appreciated that the shape of the mask 26 can be any desirable shape to produce a surface feature having a desired shape on the cutting insert 100. For example, the mask 26 can have a shape to produce a groove, a channel, a ledge, a tear-drop shaped feature, or any other desired surface feature on the cutting insert 100.

By definition, an isosceles trapezoid is a convex quadrilateral with a line of symmetry bisecting one pair of opposite sides, making it automatically a trapezoid. Two opposite sides (the bases) a, b are parallel, and the two other sides (the legs) c, d, are of equal length (a property shared by the isosceles trapezoid and by the parallelogram). The diagonals are also of equal length. The base angles, e, of an isosceles trapezoid are equal in measure (there are in fact two pairs of equal base angles, where one base angle, e, is the supplementary angle of a base angle, f, at the other base).

The particular dimension of the mask 26 causes the laser beam 14 entering the mask 26 to have a particular dimension after exiting the mask 26. For example, the mask 26 can have a dimension such that the laser beam 14 entering the mask 26 to have about ⅒th the dimension when exiting the mask 26. Other dimensional ratios are within the scope of the invention. This change in dimension of the laser beam 14 by the mask 26 allows the amount of material removed from the cutting insert 10 to be selectively adjusted by the mask 26. More specifically, the smaller the dimension, a, the less material is removed from the cutting insert 100 as compared to the dimension, b, when the laser beam 14 is projected onto the surface of the cutting insert 100, and vice versa. Thus, for the case where the dimension, a, of the mask 26 is equal to zero (0) and the dimension, b, is non-zero (i.e. the mask 26 has a shape of a triangle), then no material (or very little material) is removed by the laser beam 14 when the mask 26 with the zero dimension, a, is projected onto the surface of the cutting insert 100 as compared to the non-zero dimension, b. Conversely, for the case where the dimension, a, of the mask 25 is equal to the dimension, b, (i.e. a rectangle), then the same amount of material is removed by the laser beam 14 when the mask 26 is projected onto the surface of the cutting insert 100.

It will be appreciated that the invention is not limited by the particular dimensions a, b of the mask 26. FIGS. 2(a)-(c) show only some possible dimensions a, b, of the mask 26. One skilled in the art would understand that many other dimensions a, b are contemplated by the inventors and are within the scope of the invention.

Figure 3:
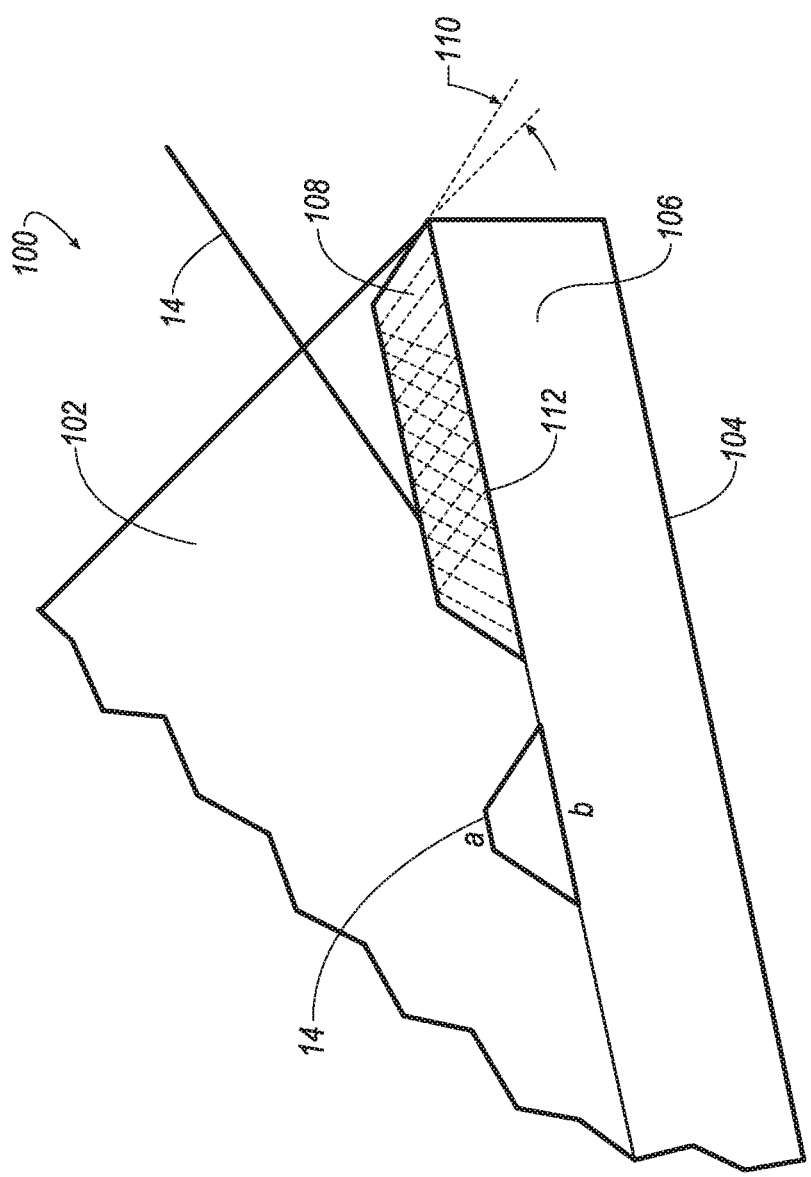
FIG. 3 is an enlarged perspective view of the cutting insert and a T-land surface produced by using the method of the invention.

As mentioned above, the mask 26 having an isosceles trapezoid shape is capable of producing a T-land surface on the cutting insert 100. Referring now to FIG. 3, the cutting insert 100 has a top rake face 102, a bottom rake face 104 and a flank face 106. The top rake face 102, the bottom rake face 104 and the flank face 106 can be substantially planar. The laser beam 14 is projected substantially normal to the top rake face 102 of the cutting insert 100. However, because the dimension, a, is smaller than the dimension, b, the mask 26 causes more material to be removed towards the flank face 106 as compared to the top rake face 102 of the cutting insert 100. By moving the laser beam 14 in a pre-programmed manner with respect to the cutting insert 100, a T-land surface 108 is created by the laser beam 14 having an angle 110 with respect to the top rake face 102. The magnitude of the angle 110 can be selectively adjusted by changing the relative dimensions a, b of the mask 26. For example, an angle 110 with a larger magnitude can be produced by reducing the dimension, a, as compared to the dimension, b, which produces more material to be removed towards the flank face 106. Conversely, an angle 110 with a smaller magnitude can be produced by increasing the dimension, a, as compared to the dimension, b, which produces more material to be removed towards the top rake face 102. In the case where the dimensions a, b are equal, a groove can be formed in the top rake face 102. A cutting edge 112 is formed at the intersection between the T-land surface 108 and the flank face 106 of the cutting insert 100.

In the illustrated embodiment, the cutting insert 100 has a generally polygonal shape. However, it will be appreciated that the invention can be practiced with a cutting insert having a generally cylindrical shape, a round shape, or any other polygonal shape.

The principles of the invention is particularly suitable for cutting inserts having a hard coating of cubic boron nitride, polycrystalline diamond, polycrystalline cubic boron nitride layer, diamond layer, diamond like carbon, titanium aluminum nitride, titanium carbide, titanium carbonitride, titanium nitride, and/or alumina. However, it should also be appreciated that the invention also has application to uncoated cutting inserts. Specific substrates and uncoated cutting inserts contemplated by the invention include tungsten carbide-based cemented carbides, Ti(C,N)-based cermets, polycrystalline cubic boron nitrides (either of the ceramic type or the cermet type), and ceramics such as alumina silicon nitride, and SiAlON-based (i.e., more that 50 volume percent) materials either with or without a ceramic particulate or whisker (e.g., zirconia, tungsten carbide, titanium carbide, titanium carbonitride and/or titanium nitride) reinforcement phase dispersed therein.

As described above, the method of the invention focuses electro-magnetic radiation, such as ultraviolet (UV), infrared (IR), Green wavelength, and the like, into a diffraction limited spot with extremely high fluence (i.e., energy density) in the focal place of the projection optics. This spot, in turn, either breaks the chemical bonds, sublimates (vaporizes) or melts the substrate material onto which this radiation is exposed. Once a programmed tool path is transferred to a motion system, a focal spot with high fluence can remove material, thereby creating the desired shape on the cutting insert. An automated video edge detection technique of a type well-known in the art can be used to overcome and compensate for any deviation in the outer profile of the cutting insert during the material removal process. Unlike conventional grinding techniques, there is no physical contact between the material removal tool and the cutting insert using the method of the invention, which reduces any stresses induced in the cutting insert material during the material removal process.

In one embodiment of the method of the invention, an excimer laser uses near-field (image projection) technique to remove material from the cutting insert. For example, the excimer laser can be used to remove material at the intersection between the top surface (i.e. rake face) and side surface (i.e. flank face) in such a way so as to produce a T-land surface on the cutting insert. The angle of the T-land surface can be selectively adjusted by changing the shape of a mask and projecting the image in a high fluence focal plane to preferentially remove more material towards the flank face as compared to the rake face, thereby creating the desired angle at the intersection between the rake face and the flank face.

In another embodiment, a DPSS laser uses a far-field imaging technique to remove material. In general, the laser beam of a DPSS laser is manipulated to follow pre-programmed tool path to remove material in the focal plane of the optics. It will be appreciated that other types of electromagnetic radiation can be utilized to remove material according to the principles of the invention.

The patents and publications referred to herein are hereby incorporated by reference.

Having described presently preferred embodiments the invention may be otherwise embodied within the scope of the appended claims.

What is claimed is:

1. A method of removing material from a cutting insert comprising focusing a truncated laser beam onto a surface of the cutting insert, thereby creating a surface feature on the surface of the cutting insert, the surface of the cutting insert being formed of at least one of cubic boron nitride, polycrystalline diamond, polycrystalline cubic boron nitride, diamond, diamond-like carbon, titanium aluminum nitride, titanium carbide, titanium carbonitride, titanium nitride and alumina.

2. The method of claim 1, wherein the laser beam passes through a mask that reduces a dimension of the beam of electromagnetic radiation.

3. The method of claim 2, wherein the mask has a shape of an isosceles trapezoid.

4. The method of claim 3, wherein the surface feature is a T-land surface.

5. The method of claim 1, wherein the laser beam is produced by an excimer laser.

6. The method of claim 1, wherein the laser beam is produced by a diode-pumped solid-state (DPSS) laser.

7. The method of claim 1, wherein the laser beam passes through a homogenizer prior to passing through a mask.

8. A method of removing material from a cutting insert, comprising:
producing a truncated laser beam using a source of electromagnetic radiation;
passing the laser beam through a homogenizer such that a cross section of the laser beam has a uniform energy density;
passing the laser beam through a mask having a predetermined shape, wherein the mask reduces a dimension of the laser beam; and
focusing the laser beam onto a surface of the cutting insert, the surface being formed of at least one of cubic boron nitride, polycrystalline diamond, polycrystalline cubic boron nitride, diamond, diamond-like carbon, titanium aluminum nitride, titanium carbide, titanium carbonitride, titanium nitride and alumina,
whereby an amount of material removed from the cutting insert can be selectively adjusted by changing the predetermined shape of the mask.

9. The method of claim 8, wherein the predetermined shape is an isosceles trapezoid.

10. The method of claim 9, wherein the surface is a T-land surface.

11. The method of claim 8, wherein the laser beam is produced by an excimer laser.

12. The method of claim 8, wherein the laser beam is produced by a diode-pumped solid-state (DPSS) laser.

13. An apparatus for removing material from a cutting insert, comprising:
a source of electromagnetic radiation for producing a laser beam;
an aperture for producing a truncated laser beam;
a homogenizer for providing a cross section of the truncated laser beam with a uniform energy density for material removal from a surface of the cutting insert;
a mask having a predetermined shape for reducing the dimension of the truncated laser beam; and
an imaging lens for projecting the truncated laser beam onto the surface of the cutting insert,
wherein the predetermined shape of the mask provides for selective adjustment of an amount of material removed from the surface of the cutting insert, the surface being formed of at least one of cubic boron nitride, polycrystalline diamond, polycrystalline cubic boron nitride, diamond, diamond-like carbon, titanium aluminum nitride, titanium carbide, titanium carbonitride, titanium nitride and alumina.

14. The apparatus of claim 13, wherein the mask has a shape of an isosceles trapezoid.

15. The apparatus of claim 14, wherein the mask produces a T-land surface at an intersection between a top rake face and a flank face of the cutting insert.

16. The apparatus of claim 13, wherein the source of electromagnetic radiation comprises an excimer laser.

17. The apparatus of claim 13, wherein the source of electromagnetic radiation comprises a diode-pumped solid-state (DPSS) laser.

18. The method of claim 1 further comprising passing a laser beam through an aperture to provide the truncated laser beam.

19. The method of claim 1, wherein the surface of the cutting insert is formed of cubic boron nitride, polycrystalline cubic boron nitride, diamond, polycrystalline diamond or diamond-like carbon.

20. The method of claim 8, wherein the surface of the cutting insert is framed of cubic boron nitride, polycrystalline cubic boron nitride, diamond, polycrystalline diamond or diamond-like carbon.

* * * * *